UNITED STATES PATENT OFFICE 2,584,972

METHOD FOR PREVENTING DETERIORATION OF SEEDS

Aaron M. Altschul, Marjorie Z. Condon, and Madeline G. Lambou, New Orleans, La., assignors to the United States of America as represented by the Secretary of Agriculture No Drawing. Application March 12, 1948, Serial No. 14,635

8 Claims. (Cl. 99—153)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to seeds, particularly cottonseed, flaxseed, sunflowerseed, rice and grain sorghum, and has among its objects the provision of a process of chemically treating such seeds to prevent their deterioration during storage. Another object is to prevent the formation of free fatty acids from glycerides in oilseeds such as cottonseed, flaxseeds, and so forth, during storage. Other objects will be apparent from the description of the invention.

The deterioration of seeds during storage is the result of natural processes involving the activity of enzyme systems within the seeds. When the moisture content of seeds is high, various biological processes are accelerated and are reflected in increased rates of deterioration. Moreover, when seed of high moisture content is stored in bulk, the heat produced by respiration, and especially by accelerated respiration cannot ordinarily be dissipated rapidly from the seed pile with the result that the temperature of the seed in the pile is increased. The heating of stored oilseeds, grains, and other products of vegetable origin by processes which are the result of, or which are accompanied by, accelerated respiration is commonly referred to as spontaneous heating. Spontaneous heating, or increased temperatures resulting from biological activity of the seed, accelerates and aggravates various deteriorative processes which normally take place to various degrees in seed of high moisture content.

Any process which occurs during handling and storage of seed prior to processing and which results in decreased value of the seed, or its derived products, for food or industrial purposes may be classed as deterioration. In oilseeds, such as cottonseed, flaxseed, sunflowerseed, and so forth, the hydrolysis of the natural glycerides (fats and oils) to form free fatty acids during storage constitutes an example of a specific type of deterioration. Spontaneous heating of seeds in storage provides a favorable environment for the growth of molds and other microorganisms which contribute to the total respiration and to an augmentation of the heat evolved. Any extensive mold proliferation or other microbiological activity in the seed which results in lowering the quality and utility of the seed or its derived products for food and industrial uses constitutes another form of deterioration. The development of abnormal colors and flavors in stored seed likewise constitutes deterioration.

Prior to storage, it is customary practice to reduce the moisture content of seed of excessively high moisture by such methods as blowing or aspirating air under certain conditions of temperature and humidity over or through the seed. The rate, time, and cost of drying seed by this means is dependent upon the initial moisture content of the seed. When seed is harvested by means of combines, the moisture content is usually higher than that of seed which has been shocked and dried in the field prior to threshing. Furthermore, such seed tends to undergo sweating in storage providing more favorable conditions for the heating of this seed. This seed must be dried immediately upon harvest to prevent excessive deterioration and such drying operations require more time and are more costly than drying or curing in the shock. Once seed is dried to a sufficiently low moisture content, it may be stored in bulk without serious deterioration for relatively long periods. Frequently, however, a considerable period of time elapses before the moist seed can be dried and considerable deterioration may have taken place prior to drying.

Another means of minimizing deterioration of seeds during handling and storage is to cool them whenever they begin to heat. This cooling may be accomplished either by moving the seed on conveyors, as is more common practice in the grain processing industry, or by aspirating or blowing air through the stored seed. Although deterioration can be reduced by these means, it is costly and the seed requires constant attention. Also, it is not entirely effective because some enzymatic degradation of the seed takes place even at temperatures as low as 75° F.

We have discovered that the spontaneous heating of seeds can be inhibited, and the biological processes leading to deterioration minimized, for prolonged periods without affecting the food or industrial value of the seed or its derived products. These improvements in the quality of stored seed are accomplished, in general, by treating the seed prior to storage with a halohydrin such as ethylene chlorhydrin, propylene chlorhydrin, trimethylene chlorhydrin, ethylene bromhydrin, and related compounds.

The effect of this treatment is to inhibit the activity of the enzymes of the seed which are responsible for heating and deterioration. Seed which has been treated by the method of our invention will not undergo spontaneous heating and consequently will not facilitate the growth of microorganisms. Therefore, a secondary effect of our treatment is to reduce the proliferation of molds and other microorganisms in the stored seed and thus obviate the harmful effects resulting from their growth.

It is not a primary object of our invention to preserve the viability of the seed. However, for short periods of time after the treatment of the seed by the method of our invention, the viability of the treated seed is increased over that of similar seeds which have not been treated according to our method, but after prolonged periods of storage the treated seeds do not have greater viability than the untreated seeds.

The preferred treatment according to the method of our invention is to spray the seed, while it is being moved in a closed conveyor, with the required amount of chemical and then to store the seed in a closed bin or storage house. Seed, thus treated, requires no further attention or treatment. The length of time during which the treatment will be effective will depend upon the moisture content of the seed at the time it is treated and the concentration (ratio of chemical to seed) of the chemical used for the treatment. With seed of excessively high moisture content, the treatment will be effective for a shorter period than for seed of lower moisture content. We have found, however, that treatment of seed with a halohydrin at a concentration of about 0.4% calculated on a dry weight basis of the seed is adequate for safe storage of most types of seed, and that treatment with this chemical in the concentration range of 0.2 to 1.0% will effectively inhibit deterioration for prolonged periods in all types of seeds having moisture contents up to about 30%.

We have treated the seeds from various species of plants by the method of our invention and have found that the treatment is effective regardless of whether the seeds have a high or low oil content or a high or low carbohydrate content.

The process of our invention is further illustrated, although it is not restricted, by the following examples:

Example I

Flaxseed, which has been conditioned to a moisture content of 15%, was divided into three lots. One lot was treated with ethylene chlorhydrin in a concentration of 0.38% on a dry weight basis of the seed and was then placed in an insulated container.

The other two lots of seed were untreated. One of the untreated lots was stored in an insulated container under conditions identical with those under which the treated seed was stored. The third lot of untreated seed was stored in a refrigerator at 36° F. All three lots of seed were stored for 138 days. During this period the maximum temperature reached by the treated seed was 84° F., whereas that of the corresponding lot of untreated seed was 93.5° F.

Examination of both lots of untreated seed at the end of the storage period showed that the unrefrigerated seed was moldy and in an advanced stage of putrefaction. The oil extracted from this seed had a fatty acid content of 17%. The refrigerated lot of seed appeared on gross inspection to be fairly well preserved and showed little evidence of mold growth, however, the oil obtained from this seed had a free fatty acid content of 12.6%. The seed which had been treated with ethylene chlorhydrin prior to storage exhibited no evidence of mold growth, had an odor of fresh flaxseed, and the extracted oil had a free fatty acid content of 2.9%. The flaxseed which had been treated with ethylene chlorhydrin and stored at room temperature resisted deterioration to a far greater extent than did the seed which had been stored in a refrigerator at 36° F. for the same length of time.

Example II

Cottonseed which had been conditioned to a moisture content of 30% was divided into two lots. One lot of seed was treated with propylene chlorhydrin in a concentration of 0.38% on a dry weight basis of the seed, and placed in an insulated container. The seed was aerated for six days under conditions which were devised to provide optimum conditions for heating and deterioration. The control lot of seed which was not treated with propylene chlorhydrin was stored for the same length of time under the same conditions as the treated seed. The untreated seed reached a maximum temperature of 102.5 F. during storage, whereas the temperature of the seed treated with propylene chlorhydrin did not exceed 97.5° F. The oil was extracted from both lots of seed at the completion of the storage period. The free fatty acid content of the oil from the treated seed was 0.7%, whereas that of the oil from the untreated seed was 6.5%. Also, the oil from the untreated seed was appreciably darker in color than that from the treated seed.

Example III

Flaxseed which had been conditioned to a moisture content of 22% was divided into two lots, one lot of which was treated with trimethylene chlorhydrin in a concentration of 0.38% on a dry weight basis of the seed. Both the treated and untreated lots of seed were stored in insulated containers under the same conditions as described in Example II. The maximum temperature attained by the untreated seed during the storage period was 103° F., whereas that of the treated seed did not exceed 80° F. Visual inspection of both lots of seed after storage for 6 days indicated that the treated seed was in an excellent state of preservation whereas the untreated seed exhibited a heavy growth of mold. The oil was extracted from both lots of seed; that from the treated seed showed a content of free fatty acids of 1.5% compared to more than 6% for the untreated seed.

Example IV

Rough rice which had been conditioned to a moisture content of 20% was divided into two lots, one of which was treated with ethylene bromhydrin in a concentration of 0.24% on a dry weight basis of the seed. Both the treated and untreated lots of seed were stored in insulated containers under the same conditions as described in Example II. The maximum temperature attained by the untreated seed during storage for 8 days was 112° F., whereas that of the treated seed did not exceed 84° F. The untreated seed was discolored and covered by a heavy growth of mold, whereas the treated seed was quite normal in appearance and had no objectionable odor.

Example V

Grain sorghum which had been conditioned to a moisture content of 20% was divided into two lots, one lot of which was treated with ethylene chlorhydrin in the concentration of 0.38% on a dry weight basis of the seed. Both the treated and untreated lots of seed were stored in insulated containers under the same conditions as described in Example II. The maximum temperature attained by the untreated seed during the storage period of 6 days was 113° F., whereas that of the treated seed did not exceed 82.5° F. Examination of both lots of seed at the end of the storage period showed that the treated seed was free of mold growth and had no objectionable odor, whereas the untreated seed was discolored and moldy.

As is indicated by the above examples, treatment of seeds having a wide range of moisture contents with ethylene chlorhydrin and its homologs and analogs is effective in preventing or reducing heating and deterioration during storage.

We have found that it is not necessary for the chlorine and hydroxyl group to be on adjacent carbon atoms as in ethylene chlorhydrin or propylene chlorhydrin in order to be active as inhibitors of heating and deterioration in seeds. The chlorine and hydroxyl group may be separated by one carbon atom as in trimethylene chlorhydrin and still be active as an inhibitor of heating and deterioration of stored seed. Bromine may be substituted for chlorine as in ethylene bromhydrin to give a compound that is active as an inhibitor of heating and deterioration in stored seeds.

Having thus described our invention, what we claim is:

1. A process for preventing deterioration of seed due to enzyme activity comprising spraying seed, containing natural enzymes and having a moisture content up to about 30%, with a liquid halohydrin in a concentration of 0.2 to 1.0%, calculated on a dry weight basis of the seed, to bring the enzymes present in the seed into chemical contact with the said halohydrin.

2. The process of claim 1 wherein the seed is an oilseed.

3. The process of claim 1 wherein the seed is cottonseed.

4. The process of claim 1 wherein the seed is flaxseed.

5. The process of claim 1 wherein the halohydrin is ethylene chlorhydrin.

6. The process of claim 1 wherein the halohydrin is propylene chlorhydrin.

7. The process of claim 1 wherein the halohydrin is trimethylene chlorhydrin.

8. The process of claim 1 wherein the seed is cottonseed and the halohydrin is propylene chlorhydrin.

AARON M. ALTSCHUL.
MARJORIE Z. CONDON.
MADELINE G. LAMBOU.

REFERENCES CITED

The following references are of record in the file of this patent:

Technical Bulletin 162, published 1929 by U. S. Dept. of Agriculture, entitled "Tests of Various Aliphatic Compounds as Fumigants," 52 pages in all, pages 1, 2, 3, 16 and 17 relied upon.